United States Patent Office 3,843,376
Patented Oct. 22, 1974

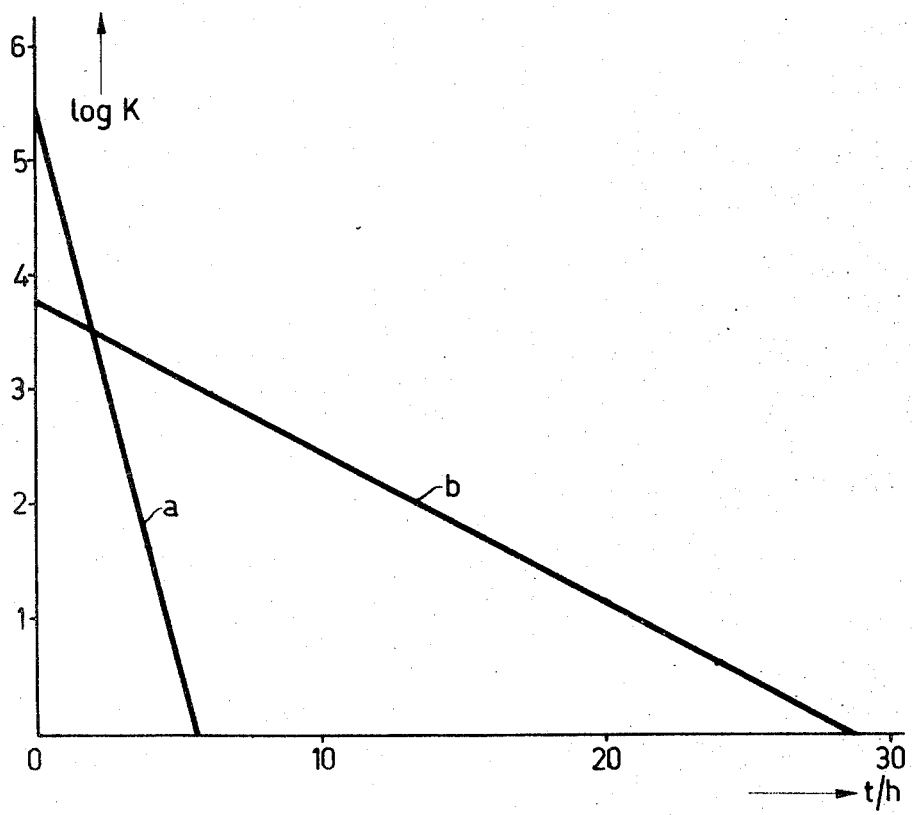

---

3,843,376
METHOD OF MANUFACTURING A MIXTURE FOR A BOROSILICATE GLASS
Johannes Cornelissen and Robertus Antonius Marie Vreeburg, Emmasingel, Eindhoven, Netherlands, assignors to U.S. Philips Corporation, New York, N.Y.
Filed Apr. 18, 1972, Ser. No. 245,145
Claims priority, application Netherlands, Apr. 24, 1971, 7105593; Dec. 17, 1971, 7117323
Int. Cl. C03c 3/04, 3/08
U.S. Cl. 106—54          2 Claims

ABSTRACT OF THE DISCLOSURE

In the manufacture of borosilicate glasses, a considerable acceleration in the melting process can be achieved when quartz powder is used having a selected particle size at least 90% of which is between 30 and 120 microns. A preferred embodiment employs between 50 and 100 microns for at least 90% of the particles. Further improvement is obtained when felspar is also used with a selected particle size at least 90% of which are between 30 and 120 microns and preferably between 50 and 100 microns.

---

The invention relates to a method of manufacturing a mixture for a borosilicate glass, consisting of a pulverulent mixture of quartz powder and other glass-forming components.

Borosilicate glasses comprise those glasses which satisfy the following conditions expressed in percent by weight:

$SiO_2$ 30-80        $R_2O$ <13 ($K_2O$, $Na_2O$ and/or $Li_2O$)
$B_2O_3$ 1-30⎫ $B_2O_3$ + $Al_2O_3$ > 6 Refining agent
$Al_2O_3$ 0-40⎭ preferably >10 RO Remainder (MgO, CaO, SRO and/or BaO).

Quartz powder for a mixture is obtained by grinding sand having a high purity, that is to say, consisting substantially of $SiO_2$ only.

Melting of such a quartz powder-containing mixture takes a fairly long period when a satisfactory homogeneous melt is required from which a borosilicate glass is obtained which is free from knobs, stressed zones, striae and stones. As a result the quantity of glass obtained from a furnace in which such a mixture is melted is low.

According to the invention it was found that a considerable acceleration of the melting process can be achieved when quartz powder is used having a selected particle size at least 90% of which is between 30 and 120 mircons.

The fact that a maximum particle size of quartz powder is important is not quite surprising with a view to kinetic considerations. It was, however, less obvious that a minimum limit of the grain size had also to be taken into account in practice. It was found that the very fine powder (<30 microns) constitutes conglomerates which disappear only very slowly by diffusion after melting. Consequently, when glass is obtained at a too fast rate, there is a great risk of inhomogeneities occurring, for example, "knobs" (these are regions having a high viscosity as a result of a high $SiO_2$ content) upon drawing tubular glass.

The use of the selected powder, in which the particle size below 30 microns is substantially absent, has the additional advantage of less dust which is of great importance for reasons of health.

Quartz powder whose particle size is between 50 and 100μ for at least 90% is preferred.

According to a further elaboration of the invention it was found that when the mixture also comprises felspar a further improvement of the melting behaviour is obtained when in addition to the selected quartz powder felspar is also used with a selected particle size at least 90% of which is between 30 and 120 microns and preferably between 50 and 100 microns.

A mixture comprising selected felspar only and unselected quartz powder was found to yield an improved melting behaviour to a lesser extent.

To prepare glass of the silicate type alkali chlorides, arsenious oxide and antimony oxide are known as refining agents. It was found that when refining a melt obtained from a mixture of $As_2O_3$ and $Sb_2O_3$ manufactured in accordance with the invention, a positive effect was brought about, that is to say, a further improvement of the melting behaviour was achieved as compared with the other refining agents.

A further elaboration of the invention relates to the use of a mixture for manufacturing borosilicate glass according to which arsenious oxide is preferably used as a refining agent.

The invention will now be described with reference to some examples.

EXAMPLE 1

The use of sieved quartz powder (a) was compared with non-sieved powder (b). The powders had the following distributions according to grain size:

(a)

|  | Percent |
|---|---|
| >160 μm. | 0.2 |
| >100 μm. | 1.5 |
| >63 μm. | 38 |
| >45 μm. | 75 |
| >32 μm. | 91 |
| (<32 μm. | 9) |

(b)

|  | Percent |
|---|---|
| >160 μm. | 0.5 |
| >100 μm. | 1 |
| >63 μm. | 6 |
| >40 μm. | 25 |
| (<40 μm. | 75) |

These powders were used together with boric acid, borax, sodium carbonate, potash, dolomite, calcite and alumina for melting glass of the following composition:

|  | Percent |
|---|---|
| $SiO_2$ | 73.0 |
| $B_2O_3$ | 17.4 |
| $Na_2O$ | 4.6 |
| $K_2O$ | 1.4 |
| CaO | 0.8 |
| MgO | 0.3 |
| $Al_2O_3$ | 2.5 |

A graph in the accompanying drawing shows for both mixtures the natural logarithm of K, the number of knobs per 10 gms. of glass as a function of the melting period in hours. The effect of the step according to the invention is quite obvious from the considerably shorter period within which the conglomerates have disappeared.

Similar results with respect to the melting behaviour were obtained by melting a mixture comprising sieved quartz powder for obtaining the following glasses (in percent by weight):

|  |  |
|---|---|
| $SiO_2$ | 66.7 |
| $B_2O_3$ | 19.3 |
| $Na_2O$ | 0.6 |
| $K_2O$ | 9.1 |
| $Li_2O$ | 0.7 |
| $Al_2O_3$ | 3.3 |
| $As_2O_3$ | 0.3 |
| $SiO_2$ | 64.7 |
| $B_2O_3$ | 23.1 |
| $Na_2O$ | 5.5 |
| $K_2O$ | 2.8 |
| $Al_2O_3$ | 3.9 |

EXAMPLE 2

The use of sieved felspar powder (a) was compared with non-sieved felspar powder (b). The powders had the following distributions according to grain size:

(a)

| | Percent |
|---|---|
| >100 μm. | 0 |
| >63 μm. | 79 |
| >45 μm. | 94 |
| >32 μm. | 97 |
| (<32 μm. | 3) |

(b)

| | |
|---|---|
| >160 μm. | 10 |
| >100 μm. | 20 |
| >63 μm. | 40 |
| >45 μm. | 55 |
| >32 μm. | 65 |
| (<32 μm. | 35) |

These powders were used together with sieved quartz powder, boric acid, borax, sodium carbonate, dolomite and calcite for melting glass of the following composition:

| | Percent |
|---|---|
| $SiO_2$ | 67.8 |
| $B_2O_3$ | 19.3 |
| $Na_2O$ | 5.8 |
| $K_2O$ | 3.0 |
| $Al_2O_3$ | 4.1 |

When the melting behaviour of a mixture comprising sieved felspar powder (a) and a mixture comprising non-sieved powder (b) was compared, it was found that the first mixture was without knobs after half an hour when melted at 1400° C. and the second mixture was without knobs after only 1½ hours. In both mixtures the quartz powder was present in a sieved quality, that is to say, a quality at which more than 90% had a grain size of between 50 and 100 μm. This already yielded an improvement of the melting behaviour relative to a mixture in which quartz powder was present in a non-sieved quality by approximately the same factor within the period in which knobs did not occur anymore.

What is claimed is:

1. In a method of manufacturing a glass mixture comprising the use of a pulverulent mixture of quartz powder and other glass-forming components for the manufacture of a glass which satisfies the following conditions expressed in percent by weight:

| | |
|---|---|
| $SiO_2$ 30–80 | $R_2O$ <13 ($K_2O$, $Na_2O$ and/or $Li_2O$) |
| $B_2O_3$ 1–30 | $B_2O_3 + Al_2O_3 > 6$ Refining agent |
| $Al_2O_3$ 0–40 | preferably >10 RO Remainder (MgO, CaO, SrO and/or BaO) | the improvement wherein quartz powder is used having a selected particle size at least 90% of which is between 30 and 120 microns to accelerate the melting step, said quartz particles being graduated according to the following approximate grain size distribution:

| | Percent |
|---|---|
| >160 microns | 0.2 |
| >100 microns | 1.5 |
| >63 microns | 38 |
| >45 microns | 75 |
| >32 microns | 91 |

2. A method as claimed in Claim 1 wherein the mixture further comprises felspar powder having a selected particle size at least 90% of which is between 50 and 100 microns, said felspar particles being graduated according to the following approximate grain size distribution:

| | Percent |
|---|---|
| >100 microns | 0 |
| >63 microns | 70 |
| >45 microns | 94 |
| >32 microns | 97 |

References Cited

UNITED STATES PATENTS

| | | | |
|---|---|---|---|
| 3,350,213 | 10/1967 | Peyches | 106—54 |
| 3,645,779 | 2/1972 | Kienel | 117—106 R |
| 3,617,358 | 11/1971 | Dittrich | 117—105.2 |

FOREIGN PATENTS

| | | | |
|---|---|---|---|
| 725,656 | 3/1955 | Great Britain | 106—50 |

OTHER REFERENCES

Scholes: *Handbook of The Glass Industry*, Ogden-Watney Pub. Inc., New York, N.Y. (1941), p. 5.

Scholes: *Modern Glass Practice* (1946), Industrial Pub'ns, Chicago, p. 59.

Ceramic Industry, 1967, Handbook of Materials for Ceramic Processing, p. 138.

Ceramic Age, "Micron-Sized Silica Available in Production Lots," September 1961, p. 34.

HELEN M. McCARTHY, Primary Examiner

U.S. Cl. X.R.

106—52, Dig. 8